(12) United States Patent
Bruck

(10) Patent No.: US 7,144,109 B2
(45) Date of Patent: Dec. 5, 2006

(54) GLASSES

(75) Inventor: Stefan Bruck, Nuremberg (DE)

(73) Assignee: UVEX Arbeitsschutz GmbH, Furth (DE)

( * ) Notice: Subject to any disclaimer, the term of this patent is extended or adjusted under 35 U.S.C. 154(b) by 10 days.

(21) Appl. No.: 11/000,458

(22) Filed: Dec. 1, 2004

(65) Prior Publication Data

US 2005/0117111 A1 Jun. 2, 2005

(30) Foreign Application Priority Data

Dec. 1, 2003 (DE) ............................... 103 56 038

(51) Int. Cl.
*G02C 5/14* (2006.01)
(52) U.S. Cl. .................................... 351/120
(58) Field of Classification Search ............... 351/111, 351/119–121
See application file for complete search history.

(56) References Cited

U.S. PATENT DOCUMENTS

| | | | |
|---|---|---|---|
| 2,427,469 A | 9/1947 | Morley et al. | |
| 3,212,102 A * | 10/1965 | Muller | 2/12 |
| 4,544,245 A * | 10/1985 | Stansbury, Jr. | 351/120 |
| 4,991,952 A * | 2/1991 | Grau | 351/120 |
| 5,457,505 A | 10/1995 | Canavan et al. | |
| 6,332,681 B1 | 12/2001 | Li | |
| 6,467,902 B1 * | 10/2002 | Wang-Lee | 351/120 |
| 6,755,523 B1 | 6/2004 | Wiedner | |

FOREIGN PATENT DOCUMENTS

| | | |
|---|---|---|
| DE | 201 01 724 U1 | 5/2001 |
| FR | 2 751 431 A1 | 1/1998 |
| GB | 2 168 499 A | 12/1984 |
| WO | WO 02/061495 A1 | 8/2002 |

* cited by examiner

*Primary Examiner*—Huy Mai
(74) *Attorney, Agent, or Firm*—Browdy and Neimark, PLLC

(57) ABSTRACT

In a pair of glasses comprising at least a sight piece and two ear pieces which are foldable in relation to the sight piece or a frame allocated to the sight piece about a substantially horizontal pivoting axis by approximately 180° towards the inside of the sight piece, provision is made for an inclination arrangement by which, upon use, to adjust the angular position of the ear pieces in relation to the sight piece for a stable stop position.

5 Claims, 2 Drawing Sheets

GLASSES

BACKGROUND OF THE INVENTION

1. Field of the Invention

The invention relates to a pair of glasses, comprising at least one sight piece and two ear pieces which are foldable in relation to the sight piece or a frame allocated to the sight piece about a substantially horizontal pivoting axis by approximately 180° towards the inside of the sight piece.

2. Background Art

Glasses of the generic type are known from EP 02 708 295, FR-A-2 751 431 or GB 2 168 499 A1. U.S. Pat. No. 5,457,505 and U.S. Pat. No. 6,332,681 describe conventional glasses with inclination arrangements.

In most glasses the ear pieces are attached by pivot joints of a vertical pivoting axis, with the ear pieces, for safekeeping, folding inwards about this vertical pivoting axis.

The above documents teach solutions that proceed from a horizontal pivoting axis in particular for glasses with a single continuous sight piece which is comparatively strongly curved, extending over a large angular area. In these cases the ear pieces regularly possess a curvature which approximately corresponds to that of the sight piece so that the ear pieces, when folding inwards, conform to the curve of the sight piece.

A serious drawback of prior art constructions resides in that the angular position of the ear pieces in relation to the sight piece may be misaligned inadvertently or is not adjustable at all.

SUMMARY OF THE INVENTION

It is an object of the invention to embody a pair of glasses of the type mentioned at the outset for improved conveniences of wearing.

According to the invention, this object is attained by an inclination arrangement being provided by which, when the glasses are used, to adjust the angular position of the ear pieces in relation to the sight piece for a stable stop position, with the inclination arrangement being comprised of an array of ribs and grooves that is concentric of the pivoting axis of each ear piece and a locking projection that cooperates therewith, the locking projection being disposed on the bottom side of a top frame member which stands out inwards at least by sections.

In this way, any user will be able to regulate the inclination of the ear pieces in relation to the sight piece for convenience of wearing, any inadvertent pivoting of the ear pieces relative to the sight piece being simultaneously precluded. This is accompanied with simplicity of construction, which can be put into practice at a low cost, nevertheless being aesthetically attractive. Outside the angular area spanned by the array of ribs and grooves, the locking projection does not snap-engage.

The array of ribs and grooves covers an angle of up to 45°, which is the standard area of ear-piece inclination adjustment, with the ear pieces, if pivoted beyond this angle, being able to fold inwards again without any resistance.

Details of the invention will become apparent from the ensuing description of a preferred embodiment, taken in conjunction with the drawing.

DESCRIPTION OF THE PREFERRED EMBODIMENT

Figure 1:
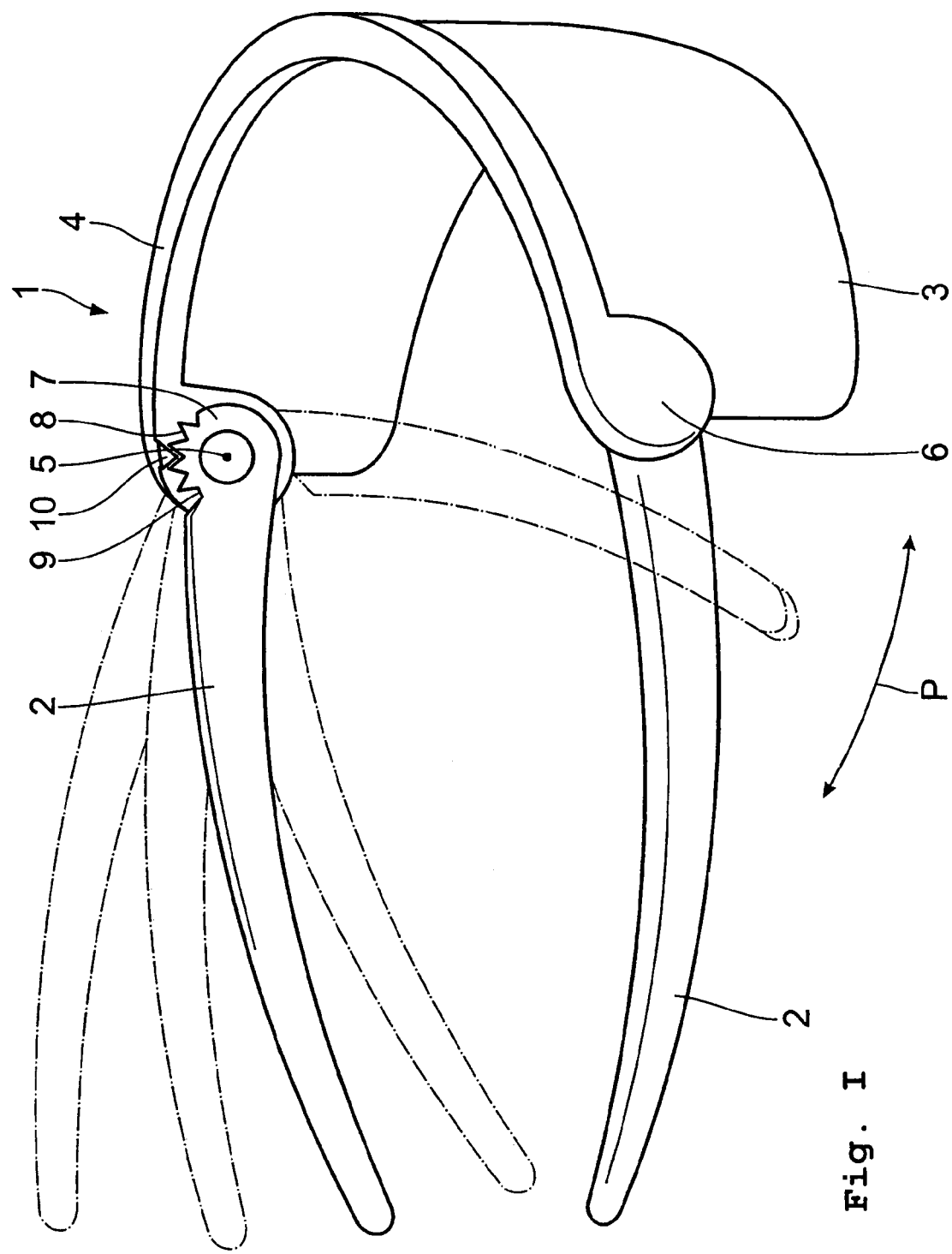
FIG. 1 is a perspective view of a pair of glasses according to the invention.
Figure 2:
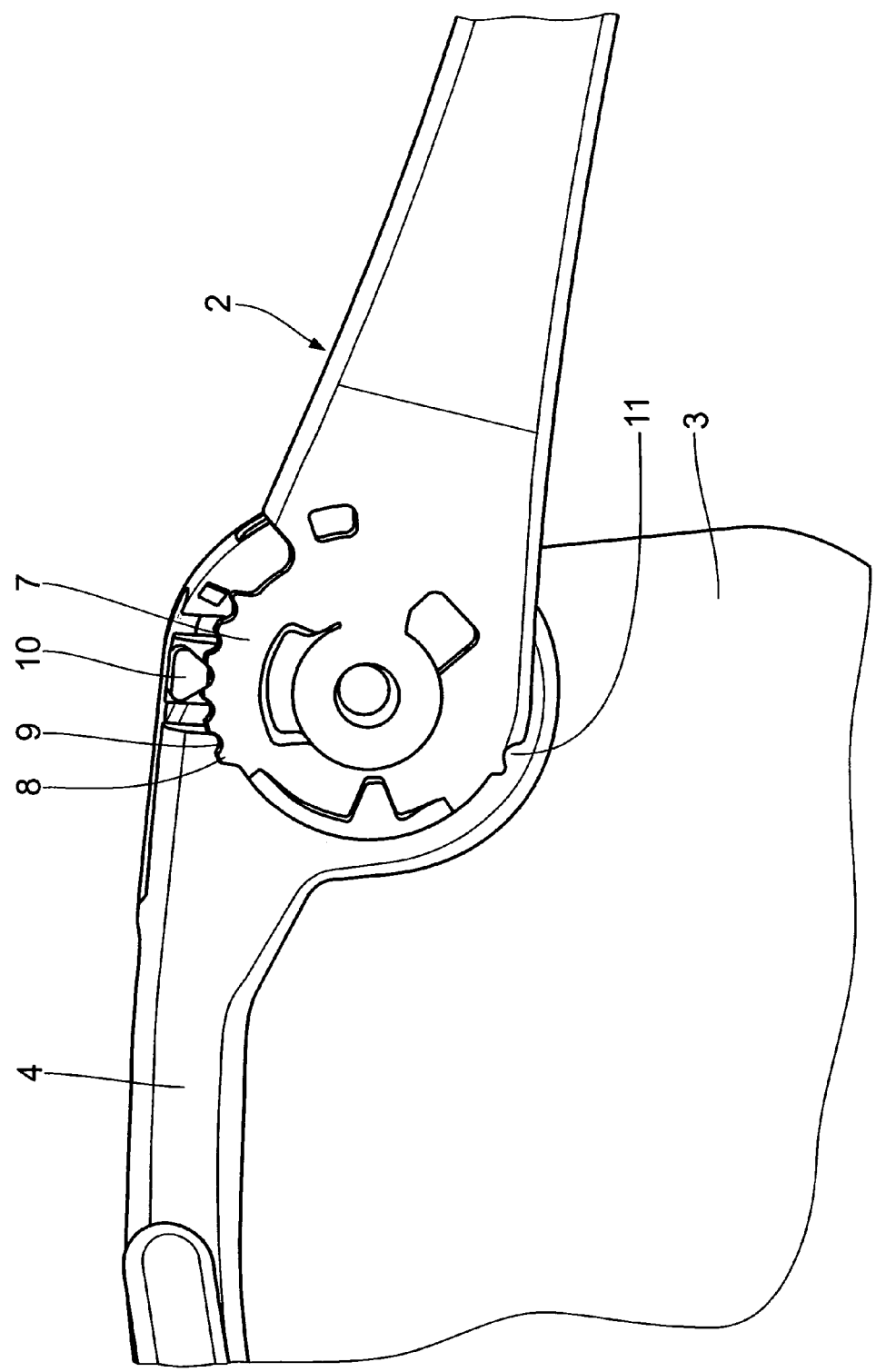
FIG. 2 is an illustration, on an enlarged scale, of the inclination arrangement.

A pair of glasses 1 seen in the drawing comprises two ear pieces 2 which are mounted on a top frame member 4 that holds a sight piece 3, the ear pieces 2 folding inwards about a substantially horizontal pivoting axis 5 by 180° in the direction of the arrow P so that the ear pieces 2, when folded inwards, substantially conform to the curvature of the sight piece 3. In the exemplary embodiment, the pivoting axes 5 are located in the vicinity of enlargements 6 on the outer ends of the top frame member 4.

On their top surface the inner ends 7 of the ear pieces 2 comprise a plurality of ribs 8 with a groove 9 forming between every two of these ribs 8.

In the vicinity of the top edge of the top frame member 4 a locking projection 10 extends downwards, cooperating with the grooves 9 in such a way that when the ear piece 2 is pivoted, the locking projection 10 snap-engages successively with the grooves 9, it being possible in this way to adjust a certain angular position of the ear pieces 2 in relation to the top frame member 4 and thus to the sight piece 3.

The locking projection 10 is free on both sides, i.e. recesses are provided where it passes into the top frame member 4, this improving the properties of flexibility and locking engagement.

Opposite the grooves 9, provision is made for another groove 11, with which to snap-engage the locking projection 10 when the ear pieces are pivoted completely inwards so that they are arrested in this position.

What is claimed is:

1. A pair of glasses comprising at least a sight piece and two ear pieces which are foldable in relation to the sight piece or a frame (4) engaged to the sight piece about a substantially horizontal pivoting axis by approximately 180° towards the inside of the sight piece, wherein an inclination arrangement (8, 9, 10) is provided to adjust the angular position of the ear pieces (2) in relation to the sight piece (3) in a stable stop position, wherein a single locking projection (10) is formed as a unit with each end and a top edge of the frame (4) so that opposite sides of the projection (10) project inward from the frame (4) and down into snap engagement with each end of the two ear pieces which pivot about the pivoting axis.

2. A pair of glasses according to claim 1, wherein the inclination arrangement (8, 9, 10) is comprised of a plurality of ribs (8) and grooves (9) and the single locking projection (10) cooperating therewith.

3. A pair of glasses according to claim 2, wherein the array of ribs (8) and grooves (9) is formed as a unit with the top edge of each ear piece (2).

4. A pair of glasses according to claim 3, wherein the array of ribs (8) and grooves (9) covers an angle at circumference of up to 45°.

5. A pair of glasses according to claim 1, wherein the opposite sides intersect to form a triangular protrusion.

* * * * *